(12) United States Patent
Taheri et al.

(10) Patent No.: US 10,326,663 B2
(45) Date of Patent: Jun. 18, 2019

(54) FABRIC-WIDE BANDTH MANAGEMENT

(71) Applicant: CISCO TECHNOLOGY, INC., San Jose, CA (US)

(72) Inventors: Parvin Taheri, San Jose, CA (US); Rong Pan, Saratoga, CA (US); Mohammad Alizadeh Attar, Cambridge, MA (US); Tom Edsall, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 31 days.

(21) Appl. No.: 15/612,685

(22) Filed: Jun. 2, 2017

(65) Prior Publication Data
US 2018/0351811 A1 Dec. 6, 2018

(51) Int. Cl.
| | |
|---|---|
| H04L 12/24 | (2006.01) |
| H04L 12/923 | (2013.01) |
| H04L 12/873 | (2013.01) |
| H04L 12/865 | (2013.01) |
| H04L 12/801 | (2013.01) |
| H04L 12/815 | (2013.01) |
| H04L 12/833 | (2013.01) |

(52) U.S. Cl.
CPC .......... *H04L 41/0896* (2013.01); *H04L 47/10* (2013.01); *H04L 47/11* (2013.01); *H04L 47/127* (2013.01); *H04L 47/18* (2013.01); *H04L 47/22* (2013.01); *H04L 47/23* (2013.01); *H04L 47/31* (2013.01); *H04L 47/524* (2013.01); *H04L 47/528* (2013.01); *H04L 47/6275* (2013.01); *H04L 47/762* (2013.01)

(58) Field of Classification Search
None
See application file for complete search history.

(56) References Cited

U.S. PATENT DOCUMENTS

| | | | |
|---|---|---|---|
| 6,765,873 B1 * | 7/2004 | Fichou | H04L 41/0896 370/230 |
| 7,203,169 B1 * | 4/2007 | Okholm | H04L 41/0803 370/232 |
| 7,543,052 B1 * | 6/2009 | Cesa Klein | H04L 43/026 709/223 |
| 7,602,807 B2 | 10/2009 | Zadikian et al. | |
| 7,978,842 B2 | 7/2011 | Cooke | |
| 8,797,877 B1 | 8/2014 | Perla et al. | |
| (Continued) | | | |

OTHER PUBLICATIONS

Lucian Popa et al., "FairCloud: Sharing the Network in Cloud Computing", SIGCOMM, Helsinki, Finland, Aug. 13-17, 2012.

(Continued)

*Primary Examiner* — Ajit Patel
(74) *Attorney, Agent, or Firm* — Cindy Kaplan

(57) ABSTRACT

In one embodiment, a method includes measuring a rate of traffic received at a leaf node, marking a plurality of packets in the flow as protected at the leaf node to match the rate of traffic with a configured rate of traffic for the flow at the leaf node, and dropping a plurality of non-protected packets at the leaf node when a queue at the leaf node is congested. A minimum bandwidth is provided for the flow based on the configured rate of traffic at the leaf node. The leaf node comprises an ingress node or an egress node connected to a fabric. An apparatus is also disclosed herein.

20 Claims, 8 Drawing Sheets

(56) References Cited

U.S. PATENT DOCUMENTS

| | | | |
|---|---|---|---|
| 9,608,926 B2 | 3/2017 | Suzuki et al. | |
| 2004/0120252 A1* | 6/2004 | Bowen, Jr. | H04L 47/10 370/229 |
| 2005/0276263 A1* | 12/2005 | Suetsugu | H04L 45/24 370/389 |
| 2006/0056365 A1* | 3/2006 | Das | H04L 41/12 370/338 |
| 2006/0245356 A1* | 11/2006 | Porat | H04L 47/10 370/232 |
| 2008/0107084 A1* | 5/2008 | Pichna | H04L 41/0896 370/332 |
| 2008/0159129 A1* | 7/2008 | Songhurst | H04L 47/10 370/229 |
| 2008/0291927 A1* | 11/2008 | Yong | H04L 47/10 370/400 |
| 2011/0158101 A1* | 6/2011 | Figueira | H04L 47/20 370/235.1 |
| 2012/0257505 A1* | 10/2012 | Kutscher | H04L 47/20 370/235 |
| 2013/0058214 A1* | 3/2013 | Foglar | H04L 41/5022 370/230.1 |
| 2014/0369182 A1* | 12/2014 | De Blasio | H04L 1/0002 370/218 |
| 2015/0207735 A1* | 7/2015 | Kuramoto | H04L 45/742 370/392 |
| 2017/0207976 A1* | 7/2017 | Rovner | H04L 41/0896 |

OTHER PUBLICATIONS

Vimalkumar Jeyakumar et al, "EyeQ: Practical Network Performance Isolation at the Edge", 10th USENIX Symposium on Networked Systems Design and Implementation (NSDI 2013).

Bose A. et al., "Evolution of the Internet QoS and support for soft real-time applications", Proceedings of the IEEE, vol. 91. No. 7, Jul. 1, 2003.

Cisco, "Campus Distribution (Cisco Catalyst 4500, QoS Design 276 End-to-End QoS Network Design", Jan. 22, 2014.

Rojas-Cessa Roberto et al., "Schemes for Fast Transmission of Flows in Data Center Netowrks", IEEE Communications Surveys & Tutorials, col. 17, No. 3, Aug. 20, 2015.

* cited by examiner

FABRIC-WIDE BANDTH MANAGEMENT

TECHNICAL FIELD

The present disclosure relates generally to communication networks, and more particularly, to bandwidth management.

BACKGROUND

In today's data centers, common network infrastructures are often simultaneously shared by multiple tenants. Conventional data center networks lack fine-grained control over bandwidth partitioning across tenants and cloud providers seldom make any promise about network performance such as bandwidth.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
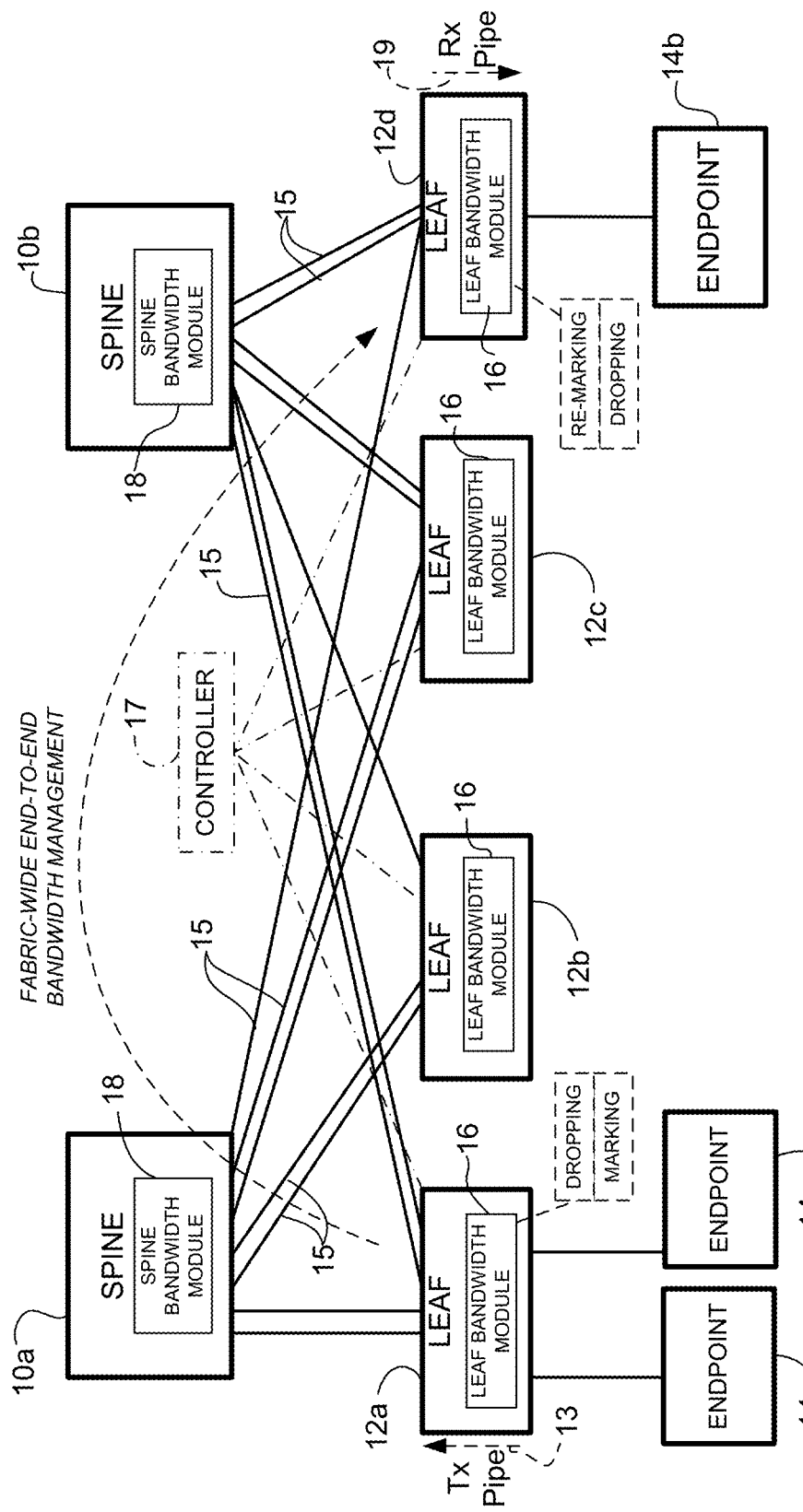
FIG. 1 illustrates an example of a network in which embodiments described herein may be implemented.

In one embodiment, a method generally comprises measuring a rate of traffic at a leaf node, marking a plurality of packets in the flow as protected at the leaf node to match the rate of traffic with a configured rate of traffic for the flow at the leaf node, and dropping a plurality of non-protected packets at the leaf node when a queue at the leaf node is congested. A minimum bandwidth is provided for the flow based on the configured rate of traffic at the leaf node. The leaf node comprises an ingress node or an egress node connected to a fabric.

In another embodiment, an apparatus generally comprises an interface at a leaf node for receiving traffic associated with a flow, a processor for marking a plurality of packets received at the leaf node as protected to match a measured rate of traffic with a configured rate of traffic for the flow at the leaf node, and dropping a plurality of non-protected packets at the leaf node when a queue at the leaf node is congested, and memory for storing the measured rate of traffic and the configured rate of traffic. A minimum bandwidth is provided for the flow based on the configured rate of traffic at the leaf node. The leaf node comprises an ingress node or egress node for communication with a fabric.

In yet another embodiment, a method generally comprises receiving at a spine node in a fabric, a plurality of packets in a flow from an ingress leaf node, the packets comprising packets marked as protected based on a configured rate of traffic at the ingress leaf node, and non-protected packets, determining that a queue at the spine node is congested, dropping the non-protected packets at the spine node, and setting a congestion notification bit in the protected packets at the spine node. Dropping of the protected packets is deferred to an egress leaf node based on a configured rate of traffic at the egress leaf node to provide a fabric-wide minimum bandwidth for the flow.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Data centers often share resources across multiple tenants, which may result in performance interference among different tenants. For example, tenants may suffer from highly variable and unpredictable network performance, leading to degradation of application performance that affects user experience. The lack of bandwidth guarantee and performance isolation in conventional networks also prevents enterprise applications from moving to the cloud.

The embodiments described herein provide end-to-end bandwidth management to enable performance isolation in multi-tenant environments. In one or more embodiments, a coherent mechanism provides fabric-wide minimum bandwidth for flows that share a common network infrastructure. One or more embodiments may be implemented in hardware to provide fast reaction time (e.g., microseconds).

Referring now to the drawings, and first to FIG. 1, an example of a network in which embodiments described herein may be implemented is shown. For simplification, only a small number of nodes (network devices) are shown. The embodiments operate in the context of a data communication network including multiple network devices. The network may include any number of network devices in communication via any number of nodes (e.g., routers, switches, gateways, controllers, edge devices, access devices, aggregation devices, or other network devices), which facilitate passage of data within the network.

In one example, the network comprises a spine and leaf based architecture. The spine and leaf network may comprise multiple spine and leaf network devices (e.g., switches), with multiple links therebetween. In the example shown in FIG. 1, a network fabric comprises a plurality of spine nodes 10a, 10b and leaf nodes 12a, 12b, 12c, 12d. The leaf nodes may be in communication with one or more endpoints (hosts) 14a, 14b, 14c. The leaf nodes 12a, 12b, 12c, 12d are connected to the plurality of spine nodes 10a, 10b via a plurality of links 15. In one example, every lower-tier node is connected to each of the top-tier nodes. In the example shown in FIG. 1, each leaf node 12a, 12b, 12c, 12d is connected to each of the spine nodes 10a, 10b and is configured to route communications between one or more endpoints 14a, 14b, 14c or other network elements.

Any number of links 15 may be used to connect the leaf and spine nodes. For example, as shown in FIG. 1, spine 10a is connected to each of the leaf nodes 12a, 12b, and 12c via two links 15, and to leaf node 12d with one link. Spine 10b is connected to each of the leaf nodes 12a, 12c, and 12d via two links, and to leaf node 12b with one link. One or more links 15 may operate as an uplink for transmitting data from leaf to spine, a downlink for transmitting data from spine to leaf, or both uplink and downlink. The link 15 may comprise one or more uplinks, downlinks, link group, or any other communication pathway that may exist between spine nodes, leaf nodes, or any network nodes. The spine nodes 10a, 10b and leaf nodes 12a, 12b, 12c, 12d may comprise any number of uplink and downlink ports operable to support connectivity at various transmission rates.

The endpoint (host) 14a, 14b, 14c may have instantiated thereon one or more virtual switches for hosting one or more virtual machines. The network may include any number of physical servers hosting any number of virtual machines. The endpoint 14a, 14b, 14c may also comprise blade/physical servers without virtual machines. Each leaf node 12a, 12b, 12c, 12d may be in communication with any number of endpoints 14a, 14b, 14c.

The spine nodes 10a, 10b and leaf nodes 12a, 12b, 12c, 12d may be switches, routers, or other network devices comprising network switching or routing elements configured to perform forwarding functions (e.g., L2, L3, or L2/L3 devices). The spine node 10a, 10b may be referred to as a fabric switch. The leaf nodes 12a, 12b, 12c, 12d may be implemented, for example, as switching elements (e.g., Top of Rack (ToR) switches) or any other network element. One of the leaf nodes may be a border leaf connected to an edge device (e.g., router) located in an external network (e.g., Internet/WAN (Wide Area Network)) (not shown). The border leaf may be used to connect any type of external network device or service (e.g., firewall, router port, etc.) to the fabric.

The term "leaf node" as used herein may refer to any type of network device configured to operate as an ingress or egress node to a fabric or provide communication between one or more hosts or endpoints and the fabric.

Each leaf node 12a, 12b, 12c, 12d may be configured to transmit traffic to the fabric and receive traffic from the fabric. In the example shown in FIG. 1, endpoint 14a is transmitting traffic on a Tx pipe 13 and endpoint 14b is receiving traffic at an Rx pipe 19. Leaf node 12a may also receive traffic (at an Rx pipe) from the fabric and leaf node 12b may also transmit traffic to the fabric (at a Tx pipe). In one embodiment, the Tx pipe 13 provides a minimum send bandwidth to the fabric and the Rx pipe 19 provides a minimum receive bandwidth from the fabric. A sending guarantee may be defined at the leaf node 12a to assure that up to a minimum guarantee will be sent to the fabric. A receiving guarantee may be defined at the leaf node 12d to assure that up to a minimum guarantee will be received at a destination. All sending and receiving guarantees are configured within available bandwidth of the fabric. The combination of a Tx and Rx bandwidth guarantee provides an end-to-end bandwidth guarantee (e.g., ingress node to egress node, fabric-wide).

In another example, traffic may be received at leaf node 12a on the Tx pipe 13 and the leaf node 12a may also transmit traffic locally at an egress (Rx pipe) at the same leaf node. For example, endpoint 14a may communicate with another endpoint 14c connected to the same leaf node 12a, thereby allowing the leaf node to transmit traffic locally without passing through the spine node 10a or 10b.

The pipe may be associated with a flow extending from an ingress node (leaf node 12a in FIG. 1) to an egress. In one example, the pipe is associated with a flow extending from an ingress node (leaf node 12a) through the fabric (e.g., spine node 10a) to an egress node (leaf node 12d). In another example, the pipe is associated with a local flow (e.g., from a Tx pipe at node 12a to an Rx pipe at node 12a). As described in detail below, a per-endpoint directional pipe may be configured with a minimum bandwidth guarantee. The term "pipe" or "flow" as used herein may refer to traffic passing through one or more leaf nodes (e.g., two leaf nodes and fabric) and associated with an endpoint, endpoint group, flow, bundle of flows using the same protocol, or any other association defined, for example, by a tenant. The flow may be identified, for example, using flow-level information (e.g., 5-tuple; source IP address, destination IP address, port number, protocol, multicast group, etc.). The flow may comprise any type of data (e.g., video, images, graphics, text, Web pages, audio, or other data or combination thereof). The data may be encrypted, compressed, or encoded according to any format. In one or more embodiments, the network-based bandwidth guarantee is limited to TCP (Transmission Control Protocol) traffic and bandwidth guarantees are not granted to non-congestion controlled flows (e.g., UDP (User Datagram Protocol)).

One or more of the leaf nodes 12a, 12b, 12c, 12d comprise a leaf bandwidth module (bandwidth guard module, bandguard module) 16 operable to provide bandwidth management (e.g., minimum bandwidth assurances/guarantees) for traffic transmitted to the fabric (Tx pipe 13) and received from the fabric (Rx pipe 19). As described in detail below, the leaf bandwidth modules 16 at the transmitting and receiving leaf nodes 12a, 12d may be configured to operate together to form an end-to-end bandwidth guarantee for a pipe (e.g., flow, endpoint, endpoint group, protocol) or may operate independently. The transmitting and receiving sides may also be independently configured to provide a fabric-wide (e.g., through fabric switch or through ingress/egress node in communication with fabric) minimum bandwidth for the flow.

One or more of the spine nodes 10a, 10b comprise a spine bandwidth module 18. As described below, most of the bandwidth management is performed at the leaf bandwidth modules 16. The spine nodes 10a, 10b do not need to maintain state, thus providing a stateless fabric for scalability. The spine nodes 10a, 10b do not know the configuration of the bandwidth guarantee at the Rx pipe 19 and therefore delegate spine policing to the egress leaf node 12d. The spine node 10a, 10b may set an FCN (Fabric Congestion Notification) bit in the packet header if the fabric is congested (e.g., queue buffer exceeds configured threshold). Packets with the FCN bit set may be dropped at the egress leaf node. In one or more embodiments, the system may rely on TCP to react to packet drops and lower the rate at sending side.

As described in detail below, bandwidth management (bandwidth guarantee) at the leaf nodes is provided by marking and dropping packets as needed to meet a configured traffic rate for the flow (Tx pipe, Rx pipe, Tx and Rx pipes). Packets may be marked, for example, as protected (guaranteed, green) or non-protected (best effort, white). The two types of traffic (protected and non-protected, guaranteed and best effort, green and white) are only provided as an example and the traffic may also be classified into more than two groups (e.g., green, yellow, white).

In one or more embodiments, the network may include a network controller 17 in communication with one or more leaf nodes 12a, 12b, 12c, 12d. The controller 17 may be used to aggregate bandwidth information (measured rate, configured rate, availability) at different leaf nodes to provide bandwidth management for flows at different leaf nodes. The controller 17 may be a physical device or a virtual element, and may be located at one network device or distributed throughout the network at different network devices in communication with one another or a central controller, for example.

It is to be understood that the network devices and topology shown in FIG. 1 and described above is only an example and the embodiments described herein may be implemented in networks comprising different network topologies or network devices, or using different protocols or processes, without departing from the scope of the embodiments. For example, the network may comprise any number of tiers of nodes (layer, level, hierarchy), and any number of nodes at each tier. The network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
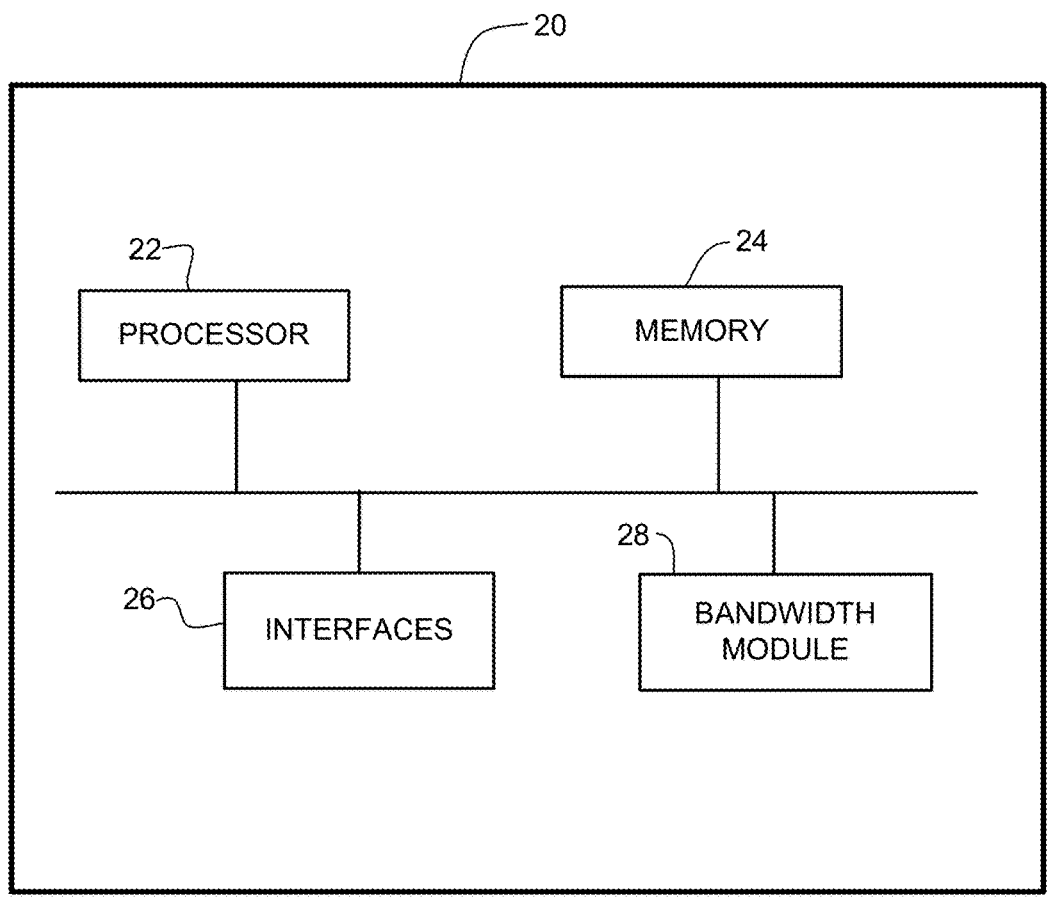
FIG. 2 depicts an example of a network device useful in implementing embodiments described herein.

FIG. 2 illustrates an example of a network device 20 (e.g., leaf node 12a, 12b, 12c, 12d, spine node 10a, 10b in FIG. 1) that may be used to implement the embodiments described herein. In one embodiment, the network device is a programmable machine that may be implemented in hardware, software, or any combination thereof. The network device includes one or more processor 22, memory 24, network interfaces 26, and bandwidth module 28. The network device 20 may also include any number of integrated circuits, which may include one or more components shown in FIG. 2 (e.g., memory, processor (microprocessor)).

Memory 24 may be a volatile memory or non-volatile storage, which stores various applications, operating systems, modules, and data for execution and use by the processor. The device 20 may include any number of memory components.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device 20 may include any number of processors 22. In one example, the computer-readable medium comprises a non-transitory computer-readable medium. The logic may be operable to perform one or more steps shown in the flowcharts of FIGS. 3A and 3B.

The network interfaces 26 may comprise any number of interfaces (linecards, ports) for receiving data or transmitting data to other devices. The network interface may include, for example, an Ethernet interface for connection to a computer or network. The network interfaces 26 may be configured to transmit or receive data using a variety of different communication protocols. The interfaces 26 may include mechanical, electrical, and signaling circuitry for communicating data over physical links coupled to the network.

The bandwidth module 28 may comprise hardware, software, or any combination thereof for performing processes described below with respect to FIGS. 3A and 3B. In one embodiment, the bandwidth module 28 may comprise one or more integrated circuits for extracting a packet header, performing a lookup, marking a packet, dropping the packet, setting a color or FCN bit in the packet header, or storing a measured rate, configured rate, or configured threshold, for example.

It is to be understood that the network device 20 shown in FIG. 2 and described above is only an example and that different configurations of network devices may be used. For example, the network device may further include any suitable combination of hardware, software, processors, devices, components, or elements operable to facilitate the capabilities described herein.

Figure 3A:
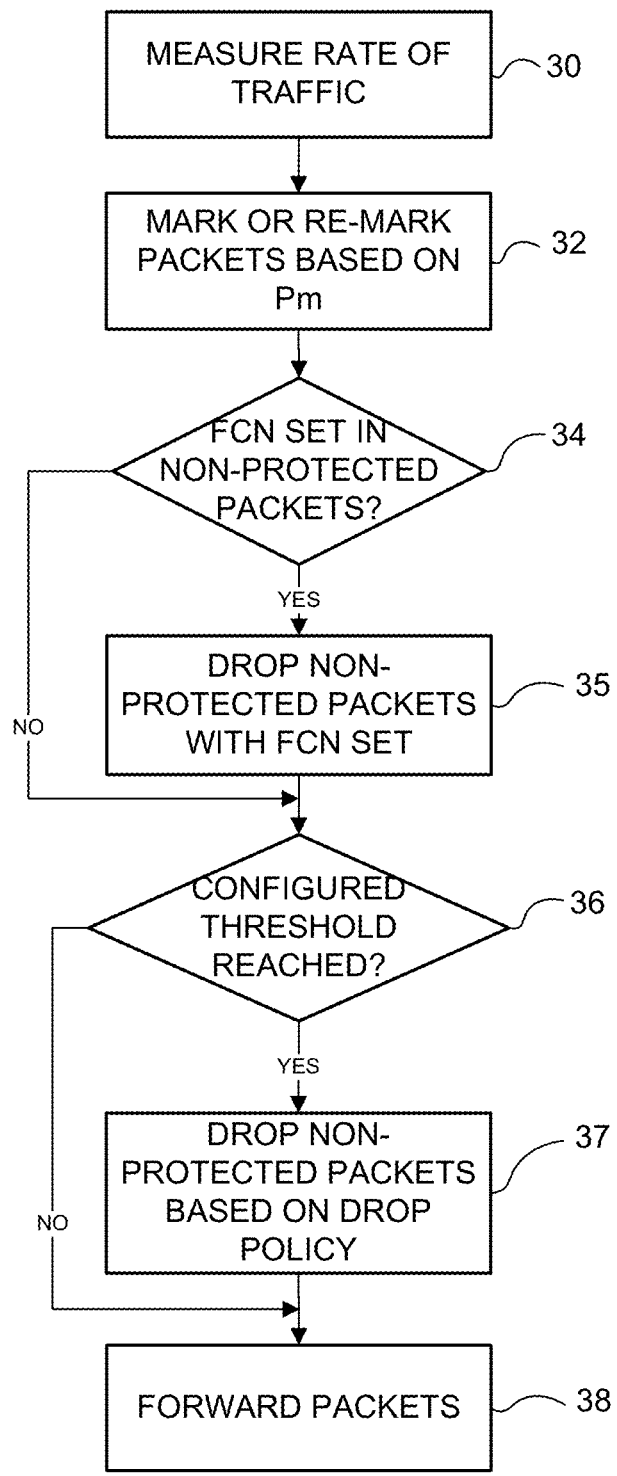
FIG. 3A is a flowchart illustrating an overview of a process for bandwidth management at a leaf node, in accordance with one embodiment.

FIG. 3A is a flowchart illustrating an overview of a process for bandwidth management at the leaf node, in accordance with one embodiment. At step 30, the leaf node (e.g., ingress node 12a, egress node 12d in FIG. 1, or leaf node operating as an ingress node and an egress node) measures a rate of traffic received at the leaf node. In one example, the traffic is associated with a flow extending from the ingress node through a fabric to the egress node or another node. In another example, the traffic is associated with a local flow passing through the leaf node. The flow at the leaf node may be from or to an endpoint, for example. The leaf node may comprise the ingress node, the egress node, or both the ingress and egress nodes. As described below, the leaf node may compute an average rate of traffic (e.g., number of bytes received over a specific time interval). The leaf node marks a plurality of packets in the flow (e.g., marks a packet if it is being transmitted to the fabric (Tx pipe), re-marks the packet if is being transmitted from the fabric (Rx pipe)) (step 32). The packets are marked as protected to match (make generally equal or percentage of) a rate of traffic (e.g., average rate of traffic) with a configured rate of traffic for the flow at the leaf node. The remaining packets are non-protected and may be marked as such or remain unmarked. For example, a plurality of packets received from the endpoint 14a on the Tx pipe may be marked green (protected) and remaining packets marked white (non-protected) based on a calculated marking probability Pm, as described below.

For packets received at the leaf node 12d from the fabric (Rx pipe), one or more packets may be re-marked from green to white or white to green. Packets received at the egress leaf node 12d may also have their FCN (Forward Congestion Notification) bit set by the spine node 10a, 10b (step 34). Remarked white packets with their FCN bit set are dropped at the leaf node 12d for the Rx pipe (step 35). If a configured threshold has been reached at either leaf node 12a or 12d (e.g., queue is congested) (step 36), a plurality of the white packets are dropped (e.g., a portion of the packets, all of the packets) (step 37). The packets may be dropped based on a drop policy, such as AFD (Approximate Fair Dropping) or any other queue management policy that provides max-min fair dropping. In one embodiment, two different thresholds (min_th, green_th) may be used as described below with respect to FIG. 3B. Remaining packets (green and white) are then forwarded from the ingress leaf node 12a to the fabric or from the egress leaf node 12d to the endpoint 14b (step 38). A configured rate of traffic may be set at the ingress node 12a and egress node 12d to provide a fabric-wide minimum bandwidth (guarantee) for the flow. The bandwidth guarantee may be configured for both Tx and Rx (together or independently), only Tx, or only Rx.

Figure 3B:
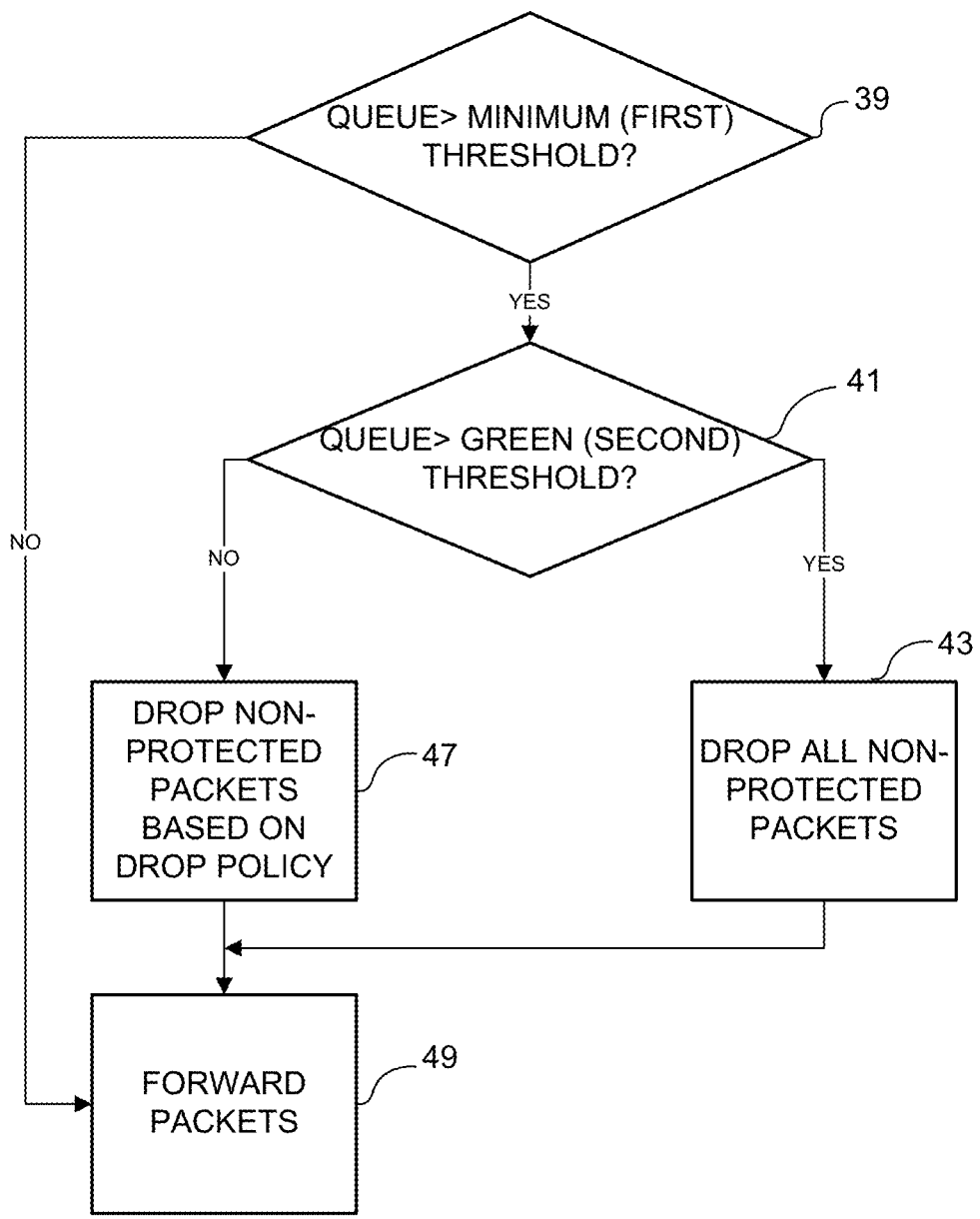
FIG. 3B is a flowchart illustrating details of a process for dropping packets, in accordance with one embodiment.

FIG. 3B illustrates details of steps 36 through 38 in FIG. 3A, in accordance with one embodiment. At step 39, a check is performed to see if the queue is over a first threshold (min_th). If the queue has not reached this minimum threshold, all packets are forwarded (step 49). If the first threshold has been reached, a check is made to see if the queue has reached a second threshold (green_th) (step 41). If this green threshold has been reached, all non-protected packets (white packets) are dropped (step 43). If the green threshold has not been reached, non-protected packets are randomly dropped based on a drop policy (step 47). The green packets and remaining white packets are forwarded (step 49).

It is to be understood that the processes shown in FIGS. 3A and 3B and described above are only examples and that steps may be added, modified, removed, or reordered, without departing from the scope of the embodiments. For example, if the process is performed at the ingress node (Tx pipe), the FCN bit will not be set in the packets and steps 34 and 35 may be removed.

Figure 4:
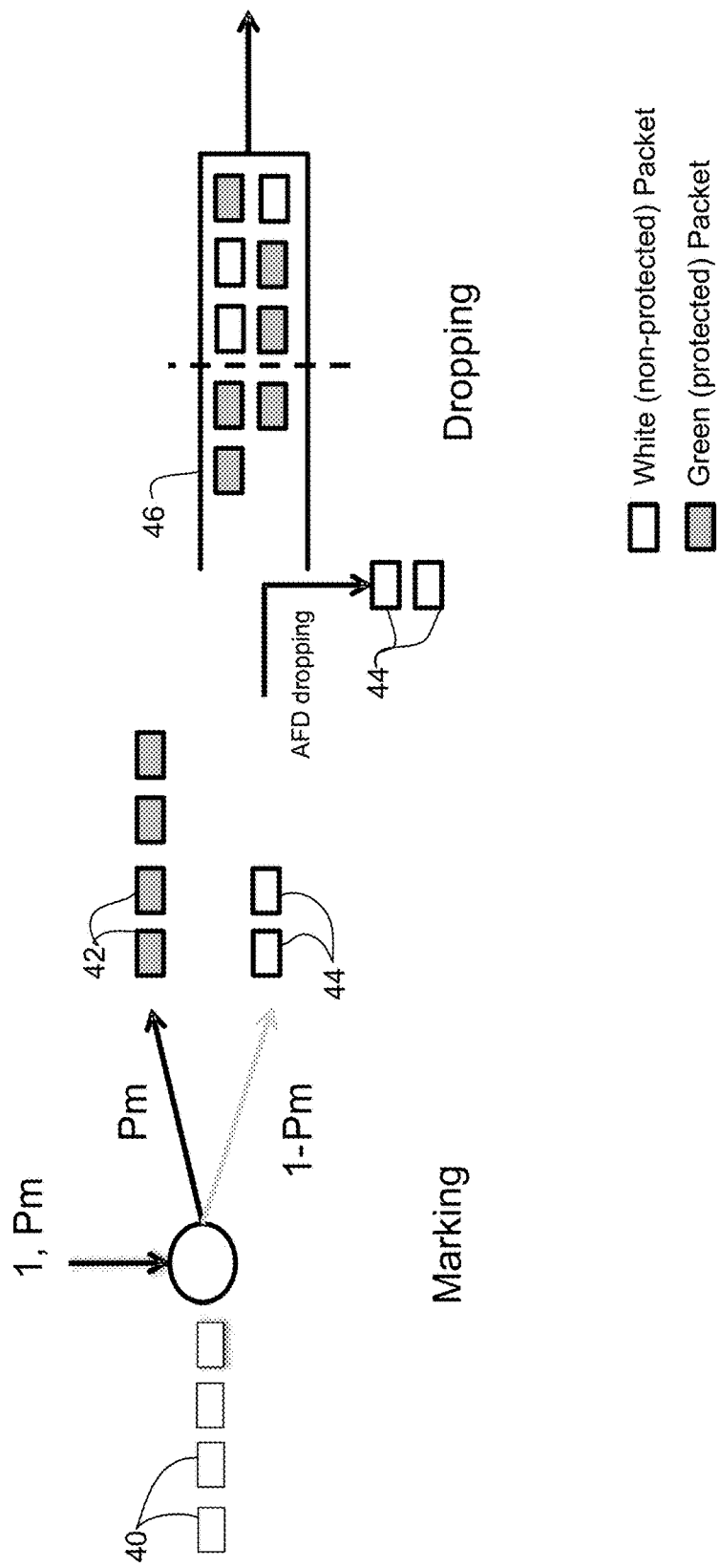
FIG. 4 illustrates marking and dropping at an ingress (transmitting) leaf node, in accordance with one embodiment.

FIG. 4 schematically illustrates marking and dropping of packets at the Tx pipe (ingress leaf node 12a in FIG. 1). All arriving packets 40 are defaulted to white. The bandwidth module 16 at the leaf node 12a measures the rate of traffic for the flow (pipe) if the pipe's Tx bandwidth guarantee is configured. In one embodiment, the rate comprises an average rate (AvgMf). As described in detail below, an algorithm may be used to probabilistically mark a portion of the incoming packets green so that the average rate of traffic matches the configured rate of traffic for the flow at the ingress leaf node 12a. A marking probability Pm defines the probability of marking the incoming packet 40 green. As shown in FIG. 4, a portion (Pm) of the incoming packets are marked green (protected) (packets 42), while the remaining packets (1-Pm) are white (non-protected) (packets 44).

Since all incoming packets 40 are the same (e.g., white) there is only one marking probability (Pm) at the ingress leaf node 12a. The initial marking probability (Pm) may be set to a default of 1 for all pipes, for example. The marking probability (Pm) becomes stable when AvgMf (average rate of traffic for the flow (pipe) at the leaf node 12a) equals Mc (configured rate of traffic for the flow at the leaf node 12a based on the configured bandwidth guarantee).

The marking probability Pm at the Tx pipe (ingress leaf node 12a) may be calculated as follows:

$$Pm = k/Mc * (Mc - AvgMf)$$

where:
Pm is the probability of marking incoming packets green;
Mc is the configured rate;
k is a control parameter for updating marking probability; and
AvgMf is the average rate of traffic for the flow (pipe).

In one embodiment, the average rate (AvgMf) is based on a measured pipe's rate of traffic in a specified time interval, as described below. In a short term, each timer interval may deterministically mark a minimum amount of packets green (minMcg), which may be, for example, 10% of the configured rate. This may be done to avoid on-off behavior of long term marking and to ensure a smooth achieved rate.

If the length of a queue 46 at the leaf node 12a is small, all colored packets (green (protected) 42 and white (non-protected) 44) are allowed to pass through the queue (FIGS. 1 and 4). Once the queue length is over a minimum threshold (min_th, configured threshold), the bandwidth module 16 may start to randomly drop white packets 44 according to a decision of an active queue management scheme.

FIG. 4 illustrates marking at a pipe (based on measurement at the pipe) and dropping at a congested queue. It should be noted that the queue 46 may receive packets from one or more pipes.

In one embodiment, AFD (Approximate Fair Dropping) is used as the active queue management scheme to provide fairness among flows. AFD takes into account flow sizes and data arrival rates and acts on long lived large flows (elephant flows), while not impacting short flows. In one embodiment, an elephant trap only counts white packets 44. The packets 44 may be dropped proportionally to their excess rate to ensure max-min fairness. In order to ensure that there is enough buffering space for the green packets 42, the bandwidth module 16 may drop all white packets 44 once the queue is over a second configured threshold (Green_th).

In one embodiment, Syn (Synchronize)/Ack (Acknowledge) protection may be provided by avoiding dropping of Syn/Ack packets on a reverse path to ensure guaranteed bandwidth.

As previously noted, congestion notification and deferred policing may be used at the spine nodes 10a, 10b to prevent congestion in the fabric and delegate policing to the egress node 12d. As described in detail below with respect to FIG. 7, the spine node 10a, 10b may set the FCN (Fabric Congestion Notification) bit at one or more green packets during congestion (e.g., if queue is over configured threshold (Green_th)). Therefore, packets arriving at the egress node 12d (Rx pipe) may be colored green or white and one or more green packets may have their FCN bit set (FIGS. 1 and 5).

Figure 5:
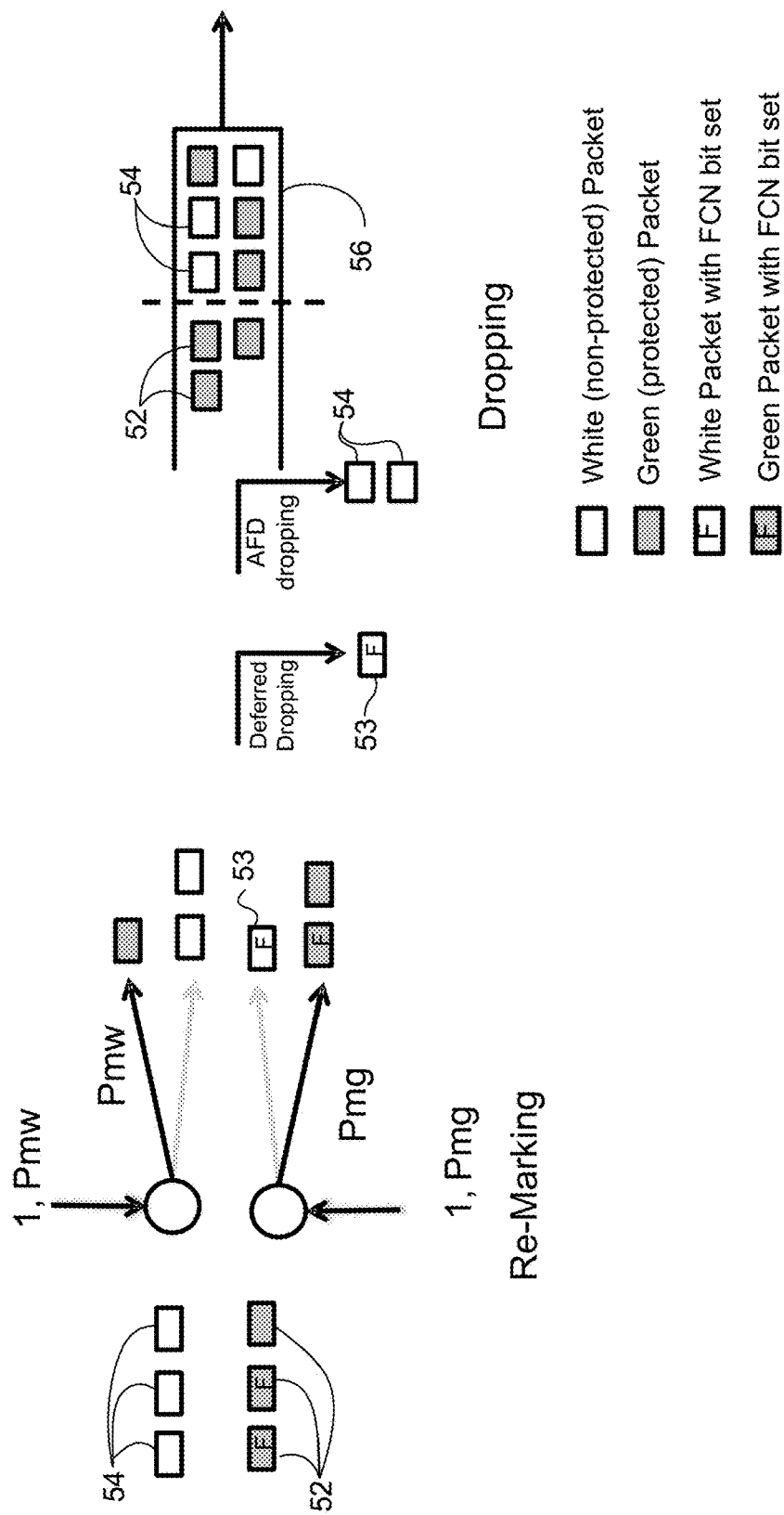
FIG. 5 illustrates re-marking and dropping at an egress (receiving) leaf node, in accordance with one embodiment.

FIG. 5 illustrates a process at the Rx pipe (egress node 12d in FIG. 1). The bandwidth module 16 is configured to handle the possibilities of arriving packets with different colors (green (protected) 52, white (non-protected) 54) and with or without the FCN bit set. If a pipe's Rx bandwidth guarantee is configured, the bandwidth module 16 measures the rate of the green packets 52 and white packets 54 in the flow (pipe). The rate may be an average rate of green packets (AvgMfg) and white packets (AvgMfw). Since there are both green packets 52 and white packets 54 arriving at the Rx pipe, there are two marking probabilities; Pmg for the probability of marking green packets green, and Pmw for the probability of marking white packets green.

In one example the marking probabilities may be calculated as:

$$Pmg = k/Mc * (Mc - AvMfg); \text{ and}$$

$$Pmw = k(Mc - AvgMfg - AvgMfw);$$

where:
Pmg is the probability of marking green packets green;
Pmw is the probability of marking white packets green;
Mc is the configured rate;
k is a control parameter for updating marking probability;
AvgMfg is the average rate of green packets received in the flow (pipe); and
AvgMfw is the average rate of white packets received in the flow (pipe).

After marking (re-marking) the packets at the Rx pipe, if a white packet has its FCN bit set, it would be dropped, as shown at packet 53 in FIG. 5. This deferred policing effectively drops packets on behalf of the fabric, which allows the spine switch design to remain simple. After deferred dropping, the bandwidth module 16 behaves similar to the Tx dropping described above and allows all packets in if the queue length is small. Once the queue length is over a minimum threshold (min_th, configured threshold), the queue 56 may start to randomly drop white packets 54 according to the decision of an active queue management scheme (e.g., AFD). To ensure that there is enough buffering space for the green packets 52, the bandwidth module 16 may drop all white packets 54 if the queue 56 is over a second configured threshold (Green_th).

As previously noted, measurement and marking take place at the pipe and dropping takes place at the congested queue. The queue 56 may receive packets from one or more pipes.

Short term marking may also be enabled at the Rx pipe and it may behave similarly as described above for Tx marking. If the pipe's Tx bandwidth guarantee is not configured (AvgMfg=0), then Rx bandwidth guarantee may be calculated as described above for Tx since the bandwidth module 16 at the egress leaf node 12*d* does not need to deal with green packets (i.e., all received packets are white).

In one or more embodiments, the bandwidth module 16 may perform operations (e.g., measure flow, mark minimum amount of packets) for a short term over a specified time interval. Long term processes (e.g., marking packets so that the average rate matches the configured rate) may then be performed for a long term over a specified time interval covering a plurality of the short term intervals. The bandwidth module 16 may allocate the guaranteed rate to flows in short term but share the extra bandwidth between flows in long term. This may be accomplished by accepting green packets of the flows but dropping white packets of each flow based on AFD, for example.

In one embodiment, a slice aggregator may store Mc (configured rate for a given pipe) and minMcg (configured minimum short term rate for a given pipe). Short term statistics for each slice may be collected and long term statistics may then be compiled at the slice aggregator. For example, the aggregator may calculate AvgMfg (average measured rate for green packets) and AvgMfw (average measured rate for white packets) based on Mig (measured rate of green packets for slice i) and Miw (measured rate of white packets for slice i) using information received from slice 1 through slice n. The aggregator may then calculate Pmg and Pmw (marking probability for green/white packets) with combined information from all slices.

In one example, at each short term interval (e.g., 30 μs or any other interval), the aggregator may read counters for Mig and Miw. Mfg and Mfw may then be calculated as Sum(slice Mig) and Sum(slice Miw), respectively. The value of Mfg may then be compared to minMcg (minimum configured rate for green packets) and Mfw may be compared to (minMcg−AvgMfg) to determine if a short term mark for the packets should change. At a longer interval (e.g., every 240 μs or any other interval), the slice aggregator may obtain the latest short term updates and calculate AvgMfg and AvgMfw. Pmw and Pmg may be provided for each slice and a signal sent to each slice to clear Mig and Miw at the end of each long term interval. It is to be understood that the short term and long term processes described herein are provided as an example implementation and other intervals or data collection, measurement, or aggregation processes may be used without departing from the scope of the embodiments.

In one example, one or more processes may be implemented in an ASIC (Application-Specific Integrated Circuit). Processes may include for example, header extraction to obtain color and FCN bits, storing statistics in short term memory (for each slice) and long term memory (for aggregation of slices), and AQM (Active Queue Management) including, for example, AFD (Approximate Fair Dropping) for egress dropping.

Figure 6:
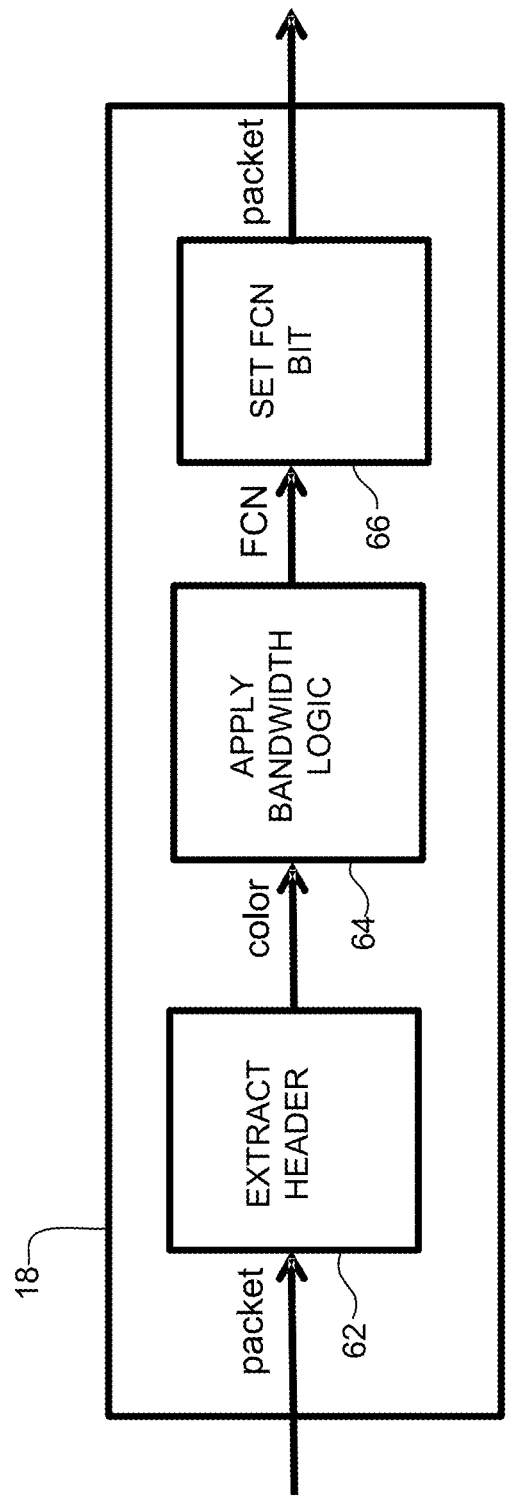
FIG. 6 illustrates operation at a spine node in the fabric of FIG. 1, in accordance with one embodiment

FIG. 6 illustrates an overview of processing performed at the bandwidth module 18 at the spine node 10*a*, 10*b* (FIG. 1). As previously noted, most of the bandwidth packet processing is performed at the leaf nodes 12*a*, 12*b*, 12*c*, 12*d*, thus, the fabric portion of the bandwidth management is easily scalable to a large number of pipes (flows). The spine nodes 10*a*, 10*b* are configured to identify packets with different colors. As previously noted, not all Tx-marked green packets may have Rx guarantees. The spine nodes do not know the configurations of the Rx guarantees and therefore delegate spine policing to the egress leaf nodes. The spine node may set the FCN bit for green packets received from the Tx pipe and drop white packets if the buffer is above a configured threshold.

As shown in FIG. 6, headers are extracted from the packet at 62 to obtain 1 bit in the VxLAN header (color bit). If the queue at the spine is over the configured threshold (Green_th), the bandwidth management logic 64 may drop all of the white packets and set the FCN bit for green packets. Block 66 sets the FCN bit in the green packets' VxLAN header according to the bandwidth management logic 64 and may also re-compute CRC.

Figure 7:
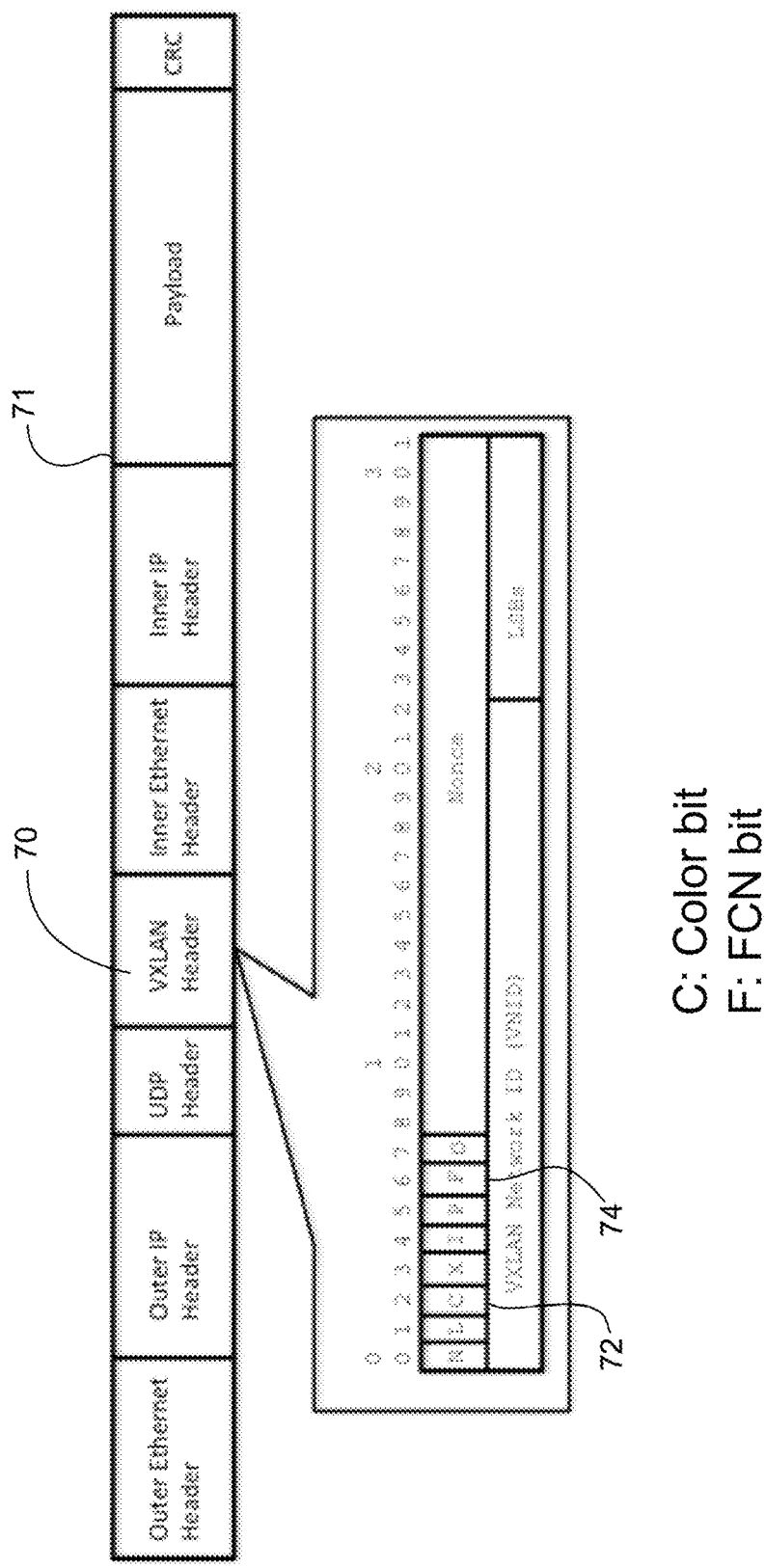
FIG. 7 illustrates an example of a header for use in transmitting color and fabric congestion information.

As previously described, in one or more embodiments, the system uses bits in the packet header to identify packet color and indicate congestion in the fabric. In one example, a VxLAN header 70 in packet 71 is used as shown in FIG. 7. The VxLAN header 70 includes a color bit 72 and FCN bit 74. It is to be understood that this is only an example and that other headers, fields, formats, or bits may be used without departing from the scope of the embodiments.

As can be observed from the foregoing, the embodiments described herein provide many advantages. For example, in one or more embodiments, minimum bandwidth assurances are provided through hardware, which performs in shorter time scale than software and does not need to operate at end hosts. By providing a minimum bandwidth guarantee rather than maximum bandwidth enforcement, the embodiments do not limit the maximum bandwidth that a flow can obtain. In one or more embodiments, the majority of the system operates at leaf nodes, while spine nodes do not need to maintain state, thus providing a highly scalable system. One or more embodiments may be used to manage bandwidth for various traffic patterns, with a flexible definition of the flow (pipe) (e.g., endpoint, endpoint group, flow bundle protocol) to which a bandwidth guarantee is provided. In addition to the bandwidth assurance, one or more embodiments may also provide max-min fairness for excess bandwidth.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    measuring a rate of traffic at a leaf node, the traffic associated with a flow at the leaf node;
    marking a plurality of packets in the flow at the leaf node as protected at the leaf node to match the measured rate of traffic with a configured rate of traffic for the flow at the leaf node, the configured rate of traffic set to provide a minimum bandwidth for the flow; and dropping a plurality of non-protected packets in the flow at the leaf node when a queue at the leaf node is congested, wherein the non-protected packets comprise packets not marked as protected;

wherein the minimum bandwidth is provided for the flow based on the configured rate of traffic at the leaf node and wherein the leaf node comprises an ingress node or an egress node connected to a fabric.

2. The method of claim 1 wherein the flow extends from the ingress node through the fabric to the egress node and wherein the minimum bandwidth provides a fabric-wide minimum bandwidth.

3. The method of claim 1 wherein the flow extends locally through the leaf node comprising the ingress node and the egress node.

4. The method of claim 1 wherein the flow comprises a directional pipe associated with a flow, an endpoint, an endpoint group, or a protocol.

5. The method of claim 1 wherein the leaf node comprises the egress node and a portion of the packets comprise an FCN (Forward Congestion Notification) bit set by a spine node when the fabric is congested to provide deferred dropping at the egress node.

6. The method of claim 1 wherein the leaf node comprises the egress node and marking the packets comprises re-marking the packets as protected or non-protected.

7. The method of claim 1 wherein dropping the non-protected packets comprises performing a max-min fair drop algorithm.

8. The method of claim 1 wherein marking the packets comprises marking the packets according to marking probability calculated based on the configured rate and an average rate.

9. The method of claim 8 wherein the leaf node comprises the ingress node and the marking probability is calculated as:

$Pm=k/Mc*(Mc-\text{AvgMf})$ where:
   Pm is a probability of marking incoming packets green;
   Mc is a configured rate;
   k is a control parameter; and
   AvgMf is an average rate of traffic for the flow.

10. The method of claim 8 wherein the leaf node comprises the egress node and the marking probability is calculated differently for the protected packets and the non-protected packets.

11. The method of claim 1 wherein the marking and dropping are performed in hardware.

12. The method of claim 1 wherein the rate comprises an average rate computed based on aggregated measured rates over a plurality of short term intervals.

13. The method of claim 1 wherein the configured rate and the configured threshold are defined for a tenant associated with the flow transmitted in a multi-tenant fabric and wherein the configured rate comprises a first configured rate at the ingress node and a second configured rate at the egress node to provide an end-to-end bandwidth guarantee.

14. An apparatus comprising:
an interface at a leaf node for receiving traffic associated with a flow at the leaf node;
a processor for marking a plurality of packets received in the flow at the leaf node as protected to match a measured rate of traffic with a configured rate of traffic for the flow at the leaf node, and dropping a plurality of non-protected packets in the flow when a queue at the leaf node is congested, wherein the configured rate of traffic is set to provide a minimum bandwidth for the flow and the non-protected packets comprise packets not marked as protected; and
memory for storing the measured rate of traffic and the configured rate of traffic;
wherein the minimum bandwidth is provided for the flow based on the configured rate of traffic at the leaf node and wherein the leaf node comprises an ingress node or an egress node for communication with a fabric.

15. The apparatus of claim 14 wherein the minimum bandwidth provides a fabric-wide minimum bandwidth for the flow from the ingress node through the fabric to the egress node.

16. The apparatus of claim 14 wherein the leaf node comprises the egress node and the packets comprise an FCN (Forward Congestion Notification) bit set by a spine node when the fabric is congested to provide deferred dropping at the egress node.

17. The apparatus of claim 14 configured to perform packet marking and dropping in hardware.

18. The apparatus of claim 14 wherein marking the packets comprises marking the packets according to a marking probability calculated based on the configured rate and an average rate and wherein the configured rate is set at the ingress node and the egress node to provide an end-to-end bandwidth guarantee.

19. A method comprising:
receiving at a spine node in a fabric, a plurality of packets in a flow from an ingress leaf node, said plurality of packets comprising packets marked as protected based on a configured rate of traffic at the ingress leaf node, and non-protected packets, wherein the configured rate of traffic is set to provide a fabric-wide minimum bandwidth for the flow and the non-protected packets comprise packets not marked as protected;
determining that a queue at the spine node exceeds a configured threshold;
dropping the non-protected packets at the spine node; and
setting a congestion notification bit in the protected packets at the spine node;
wherein dropping of the protected packets is deferred to an egress leaf node based on a configured rate of traffic at the egress leaf node to provide the fabric-wide minimum bandwidth for the flow.

20. The method of claim 19 wherein the spine node is unaware of the configured rate of traffic at the egress leaf node.

* * * * *

UNITED STATES PATENT AND TRADEMARK OFFICE
CERTIFICATE OF CORRECTION

PATENT NO. : 10,326,663 B2
APPLICATION NO. : 15/612685
DATED : June 18, 2019
INVENTOR(S) : Parvin Taheri et al.

It is certified that error appears in the above-identified patent and that said Letters Patent is hereby corrected as shown below:

On the Title Page

Item (54) and in the Specification, Column 1, Line 1:
Replace "FABRIC-WIDE BANDTH MANAGEMENT"
With "FABRIC-WIDE BANDWIDTH MANAGEMENT"

Signed and Sealed this
Sixth Day of August, 2019

Andrei Iancu
*Director of the United States Patent and Trademark Office*